United States Patent [19]

Ruder

[11] Patent Number: 4,644,339
[45] Date of Patent: Feb. 17, 1987

[54] LOW VISION ADAPTER FOR DISPLAY TERMINALS

[76] Inventor: Donald J. Ruder, 1 Fenwood Dr., Atherton, Calif. 94025

[21] Appl. No.: 471,286

[22] Filed: Mar. 2, 1983

[51] Int. Cl.⁴ ............................................. G09G 1/00
[52] U.S. Cl. .................................... 340/731; 340/407; 340/709; 340/724; 381/51
[58] Field of Search ............... 340/731, 728, 407, 752, 340/709, 724; 381/51–53

[56] References Cited

U.S. PATENT DOCUMENTS

Re. 31,200  4/1983  Sukonick ............................ 340/731
4,185,283  1/1980  Clark ................................... 340/407

*Primary Examiner*—Marshall M. Curtis
*Attorney, Agent, or Firm*—Fliesler, Dubb, Meyer & Lovejoy

[57] ABSTRACT

An adapter apparatus which is connected between an image generator and a display device. The image generator generates image signals representing an unmodified image to be displayed. The adapted stores the generated image signals and forms transformed image signals representing a portion of the unmodified image. An output device receives the transformed image signals and provides a transformed image for human sensing. The transformed image can be a magnified image, a tactile image or a speech image.

14 Claims, 6 Drawing Figures

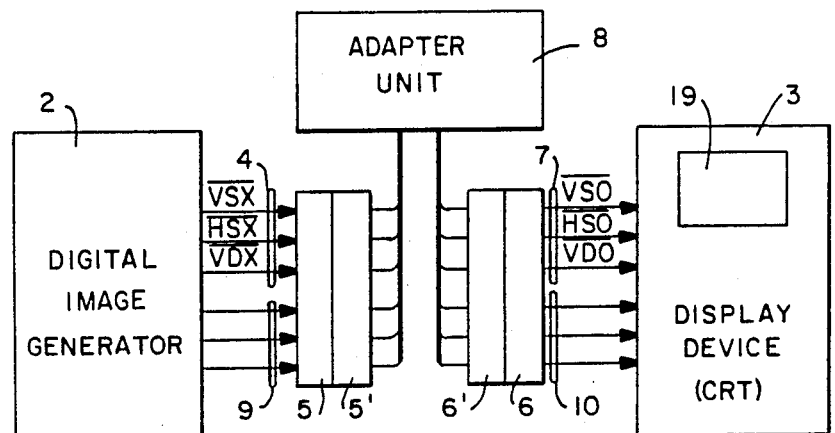
FIG.—1
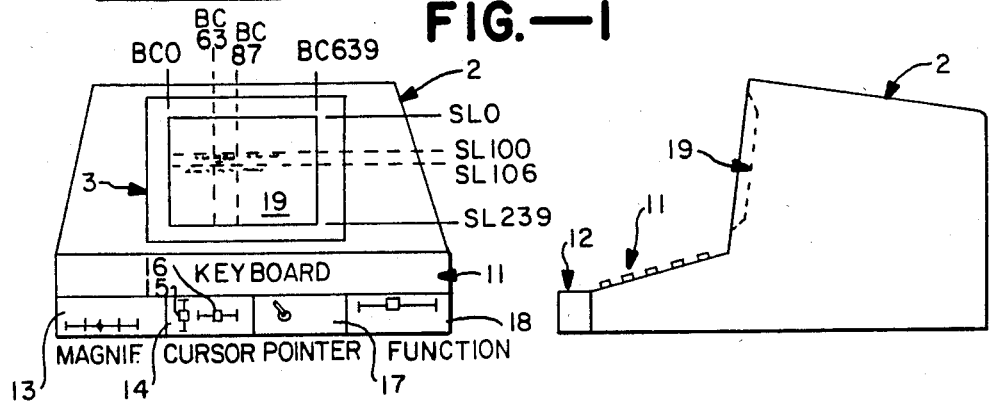
FIG.—2    FIG.—3
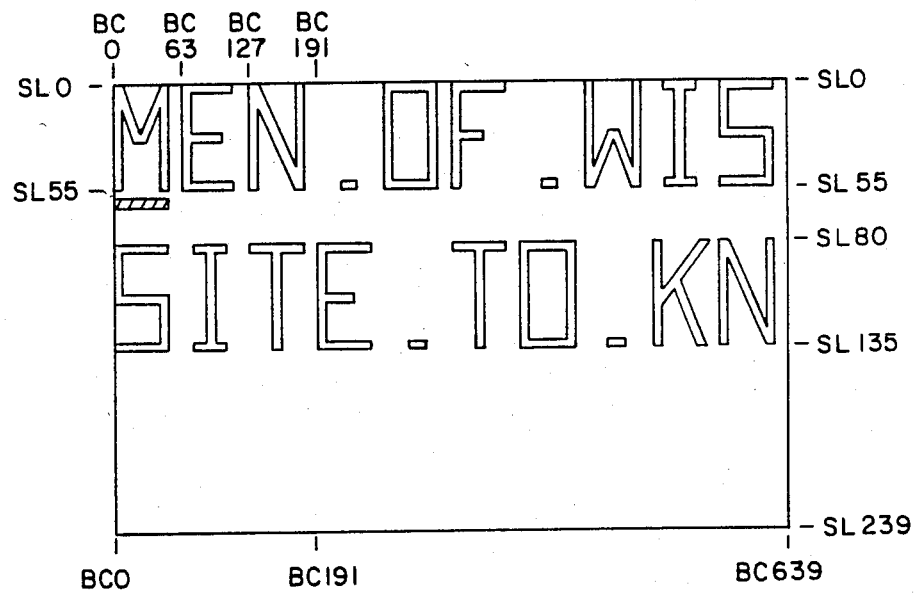
FIG.—4

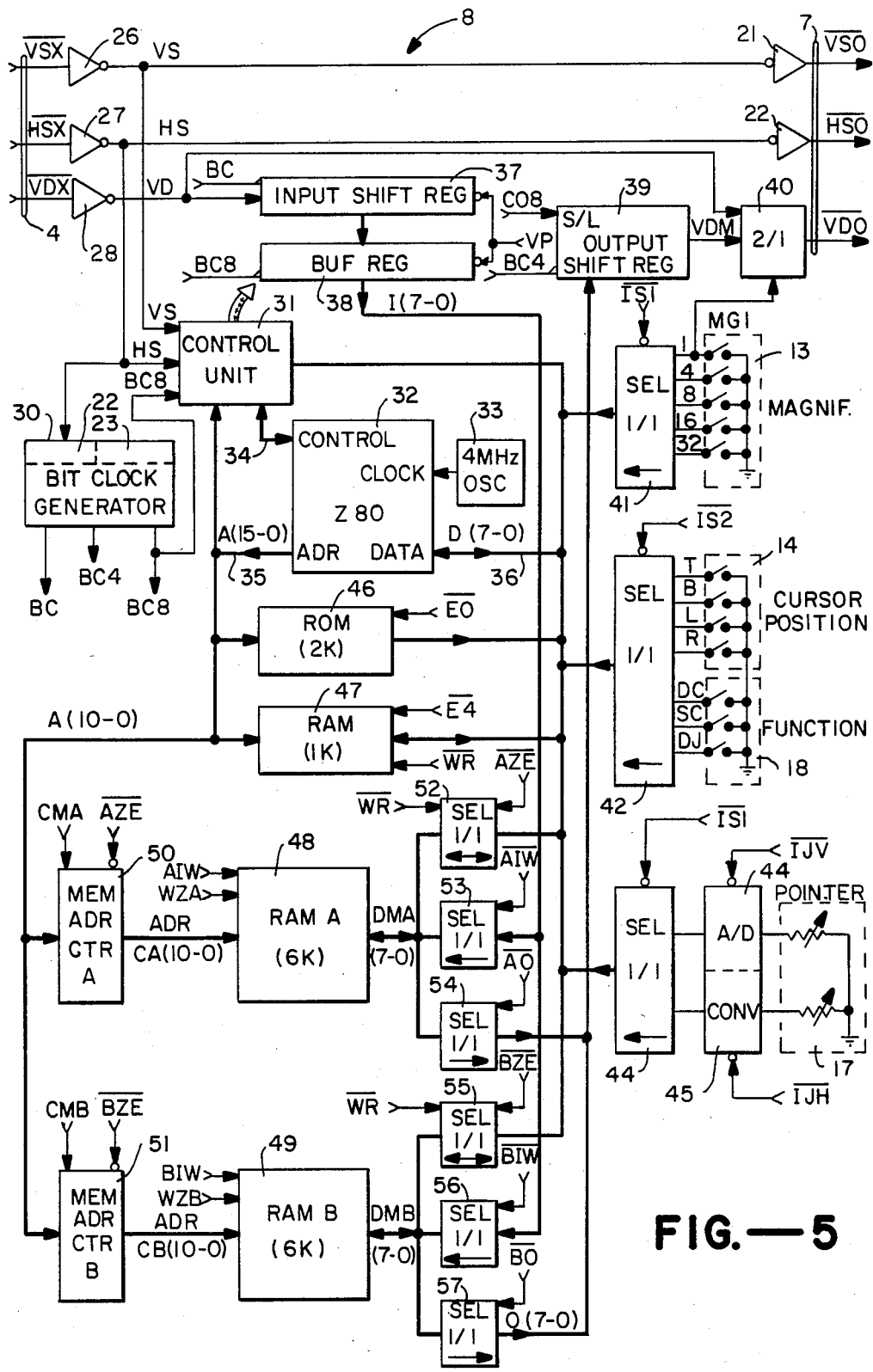
FIG.—5

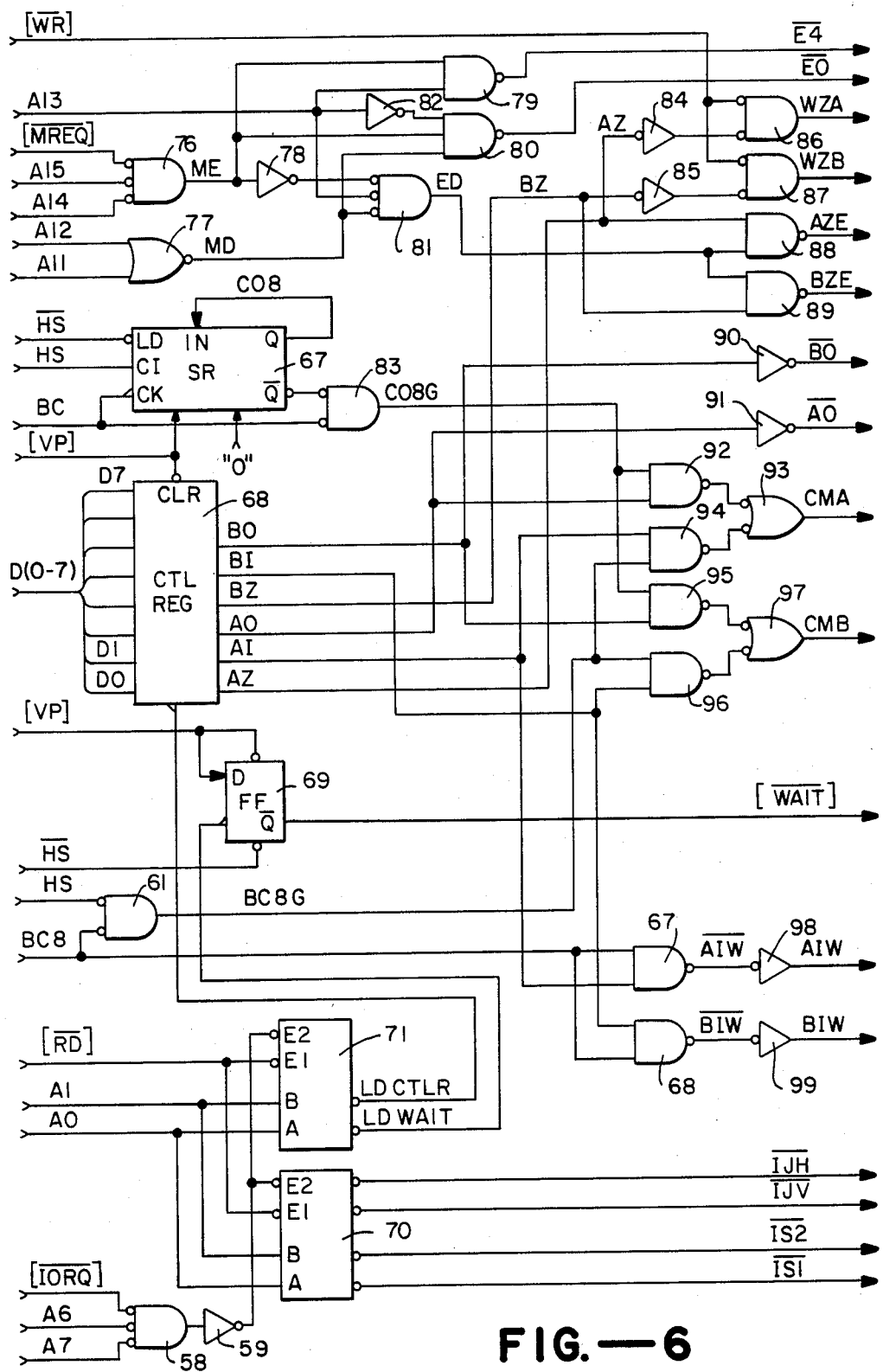
FIG.—6

LOW VISION ADAPTER FOR DISPLAY TERMINALS

BACKGROUND OF THE INVENTION

This invention relates to the field of display devices and more particularly to computer terminals and word processors which provide data to people with impaired or no vision.

Throughout the world, millions of people have impaired vision and are able to read, if at all, only enlarged, high-contrast images. Many other people cannot read at all and therefore must rely on their sense of touch using tactile devices or their sense of hearing using audible devices. Consequently, people with such impairments cannot easily use the commonly available displays associated with computers, word processors and other data processing equipment.

In order to enhance the use of data processing displays by the visually impaired, various special systems have been developed. For example, television cameras have been used to detect and magnify images from a CRT (cathode ray tube) screen. The televised image of the CRT screen is displayed in enlarged form on a separate television screen. Although such television systems do provide some help to people with poor vision, they exhibit poor machine and human interactive operation, primarily because such television systems do not have the ability to automatically find or track a cursor in the CRT image.

Special display systems have been designed for use by the visually impaired and the blind. These special systems convert display data to enlarged characters for easier viewing, to tactile images for feeling or to speech for hearing. Such special systems, however, do not generally allow the use of conventional programs and terminals. For these reasons, the special systems have been expensive compared with conventional systems for fully-sighted people.

Conventional systems for fully-sighted people have two components. One component is a digital image generator which generates image signals which represent an image to be displayed. The other component is a display device which receives the generated image signals and responsively forms the displayed image for human viewing.

In a typical and conventional CRT display device, the generated image signals include a video data signal, a horizontal synchronization signal and a vertical synchronization signal. The video data signal is modulated to be either a digital "1" or a digital "0" directing the CRT beam to be turned on or turned off as the CRT beam is scanned across different locations of the display screen. The generated image signals are converted by the display device to a human-viewed displayed image. A television monitor is a typical display device familiar to most everyone. There is a one-for-one bit mapping of the bits in the generated image signal to bits in the displayed image.

In order to facilitate machine/human interaction, the image generator through a digital processor and keyboard, or other human-controlled input device, generates a cursor for signalling a specific location in the displayed image. Frequently, the cursor appears as an underline of a character, a blinking image, or other visually detectable signal. The location of the cursor in the displayed image is utilized by a human operator as a reference location for making changes in the displayed image.

The use of a cursor together with other control functions has proven very useful for fully sighted people. People with vision impairment, however, have great difficulty in seeing the displayed image or the cursor and therefore have been excluded from usefully functioning with conventional equipment in the data processing field.

In accordance with the above background, there is a need for a device to adapt conventional and readily available display systems for use by people with impaired or no vision.

SUMMARY OF INVENTION

The present invention is an adapter apparatus which is connected between an image generator and a display device. The image generator generates image signals representing an unmodified image to be displayed. The adapter stores the generated image signals and forms transformed image signals representing a portion of the unmodified image. An output device receives the transformed image signals and provides a transformed image for human sensing. The transformed image can be a magnified image, a tactile image or a speech image. The output device is selected to provide the type of output image desired.

In accordance with one embodiment of the invention, the output device is a display and the transformed image is a magnified portion of the unmodified image. The location within the unmodified image from which the transformed image is derived is determined by a cursor in the unmodified image.

The adapter unit includes a digital memory for storing unmodified image signals from the image generator. Control means are provided for accessing the digital memory to store and retrieve both modified and unmodified image data. In order to magnify the image, each bit in the unmagnified image data is transformed to a multiple number of bits in the displayed image. This displayed image thus magnified is particularly useful for people with impaired vision.

In accordance with the above summary, the present invention achieves the objective of providing an improved apparatus which processes conventionally generated image signals to form modified images, which are particularly useful to people having impaired or no vision.

Additional objects and features of the invention will appear from the following description in which the preferred embodiments of the invention have been set forth in detail in conjunction with the drawings.

BRIEF DESCRIPTION OF THE DRAWINGS

FIG. 1 depicts a display apparatus having a low-vision adapter unit connected between a digital image generator and a visual display device.

FIG. 2 depicts a display apparatus of the FIG. 1 type having a standard keyboard, special function switches and a visual display device in a single housing.

FIG. 3 depicts an end view of the display apparatus of FIG. 2.

FIG. 4 depicts a representation of the display of an 8-times magnified image.

FIG. 5 depicts a block diagram representation of the low-vision adapter unit which forms a part of the FIG. 1 display apparatus.

FIG. 6 depicts an electrical schematic representation of the control unit which forms part of the adapter unit of FIG. 5.

DETAILED DESCRIPTION

In FIG. 1, the digital image generator 2 is a portion of word processor, computer terminal or other conventional device which generates electrical image signals representing an image to be displayed. The unmagnified image signals appear on output lines 4. The display device 3 is a television monitor, a display portion of a word processor, computer terminal, or other conventional device. Display device 3 receives, on the input lines 7, electrical image signals representing an image and responsively displays a visually perceptible image on a screen 19.

In a typical device, as shown in FIG. 1, the output lines 4 from conventional image generator 2 are terminated in a connector 5, which absent the adapter unit 8, mates with a connector 6. The connector 6 connects the lines 7 as inputs to the conventional display device 3. The connector 5 is unplugged from the connector 6 when the adapter unit 8 is present. For the present invention, the connector 5 connects to a connector 5' and the connector 6 connects to a connector 6'. The connectors 5' and 6' divert the output signals from the generator 2 through the adapter unit 8 to the display device 3.

The output signal lines 4, in one typical example, include a video data line, $\overline{VDX}$, a horizontal sync line, $\overline{HSX}$, and a vertical sync line, $\overline{VSX}$. The lines 4 carry the generated electrical image signals which represent the unmagnified image from the digital image generator 2. These lines operate in a conventional raster scan mode. Typically, a display image will be formed by a frame including 240 visible horizontal scan lines. Each scan line has a different vertical position on the output screen. After completing each scan line, an invisible retrace occurs to move the electron beam position to the start of the next scan line. Each change in scan line is indicated by assertion of the $\overline{HSX}$ signal. After each frame of horizontal scan lines is completed, the electron beam is returned to the starting location when the $\overline{VSX}$ signal is asserted. The $\overline{VDX}$ signal controls the on or off state of the electron beam. Generator 2 may include other lines 9, such as power lines, which pass through the connectors 5 and 5' directly to the connectors 6' and 6, if required.

In FIG. 1, the input lines 7 to the display device 3 typically include the video sync output line, $\overline{VSO}$, the horizontal sync output line, $\overline{HSO}$, and the video data output line, $\overline{VDO}$. The lines 10, if required, correspond to the lines 9 from the generator 2.

In FIG. 2, the display apparatus includes the digital image generator 2, a display device 3 with a CRT screen 19, a standard keyboard 11, and some special switches and controls 13, 14, 15, 16, 17 and 18.

In FIG. 2, the multiposition switch 13 enables the magnification to be selected, for example, at 1-, 4-, 8-, 16- or 32-times the size of the unmagnified image transmitted from the digital image generator 2.

In FIG. 2, the switches 14 are cursor control switches for selecting the relative position of the cursor in the magnified image. Switch 15 is typically a three-position switch with a TOP position, a CENTER position and a BOTTOM position to select the relative vertical location of the cursor in the magnified image. Similarly, the switch 16 is a three-position switch with a RIGHT, CENTER and LEFT position to select the relative horizontal location of the cursor in the magnified image.

In FIG. 2, the switch 18, in a typical example, is a three-position switch for selecting one of three modes of operation. The first mode of operation, DISPLAY CURSOR (DC), the magnified display will be a region which contains the cursor, as determined by switches 15. The second position, SCAN ACROSS (SA), signifies that different regions are to be scanned, magnified and displayed at reading speed. The third position, DISPLAY POINTER (DJ), signifies that the magnified display will be that portion of the generated image which is indicated by the pointer position. The term POINTER refers to a "joystick" device which is manually movable to specify any location in a plane, generally by specifying coordinates for the location.

In FIG. 2, the pointer 17 is one of the special controls located between the switches 14 and the function switches 18.

In FIG. 2, by way of example, the digital generator and the display device are operating with no magnification to display on screen 19, on two humanly-viewable lines, the eighty symbols as follows:

.ALL.MEN.OF.WISDOM.WILL.FIND.INVENTION.AS. PREREQUISITE.TO.KNOWLEDGEABLE.INSIGHT.

No magnifying operation is occurring by the adapter unit 8. The unmagnified image, including the eighty symbol sentence on an otherwise blank field, is displayed in a conventional manner. The unmagnified image is scanned by 240 scanlines numbered vertically SL0 through SL239 in FIG. 2.

The horizontal locations in each of the 240 scanlines, from left to right are numbered by the 640 bit locations from BC0 to BC639. In the example described, eighty 8-bit characters can be displayed on a single scan line. In the example of FIG. 2, the words in the first line commence at SL100 and extend vertically down to SL106. The words in the second line begin at SL110 and extend down to SL116. Each letter is therefore seven scanlines in height. The letter "A" in the word "ALL" commences at BC31 and the period "." after "AS" ends at BC359. In an example to be described, a subfield starting with the letter "M" in the word "MEN" will be magnified eight times. The word "MEN" begins at BC63 and extends horizontally to BC87. The letter "M" is underscored with the cursor. The letter "S" in the word "WISDOM" is the tenth character after "M" and, for 8-times magnification, will be the last part of the subfield which can be displayed.

In FIG. 3, an end view of the display apparatus of FIG. 2 is shown. Note that the switches and controls 12 are located in front of the standard keyboard 11 for easy access by the human operator. The cursor is under the "M" in FIG. 2 and switches 15 and 16 indicate the subfield to be magnified is down and to the right of the cursor.

In FIG. 4, a representation of an 8-times magnified portion of the unmagnified image of FIG. 2 is shown. In FIG. 4, the field "MEN.OF.WIS" in the first line and the field "SITE.TO.KN" from the second line from FIG. 2 is magnified eight times. With the 8-times magnification, the field including the word "MEN" begins at scanline SL0 and extends vertically downward to SL55 and the field including the partword "SITE" begins at SL80 and extends down to SL135. Similarly, the field "MEN.OF.WIS" commences at BC0 and extends horizontally to BC639. Note that in the 8-times magnification of FIG. 4, only a subfield which is one-eighth of the entire unmagnified image in FIG. 2 can be displayed at any one time. The greater the magnification, the smaller the portion of the unmagnified image that can be displayed at one time.

Adapter Unit—FIG. 5

In FIG. 5, the adapter unit 8 of FIG. 1 is shown in further detail. The lines 4 containing the image data from generator 2 connect as inputs. In the following description and the drawings, a bar or broken bar over a signal name designates the complementary form of the signal. The term "asserted" means the logical 1 or 0 state of a signal which causes the desired control function to occur. Generally, uncomplemented signals are asserted as logical 1's and complemented signals are asserted as logical 0's. The vertical sync line, $\overline{VSX}$, connects to the inverter buffer gate 26 to form the vertical sync line VS. The horizontal sync line $\overline{HSX}$ connects to the inverter buffer 27 to form the horizontal sync line HS. The video data line $\overline{VDX}$ connects to the inverter buffer 28 to form the video data line VD.

In FIG. 5, the video sync line, VS, and the horizontal sync line, HS, connect respectively through the inverter output buffers 21 and 22 to provide the video sync output line $\overline{VSO}$ and the horizontal sync output line $\overline{HSO}$. The video data line, VD, from the inverter 28, connects into the two-way multiplexer 40 and can be selected as one of the signals on the video data output line $\overline{VDO}$. The other one of the inputs to the multiplexer 40 is the magnified video data line, VDM, from the output shift register 39. The function of the two-way multiplexer 40 is to select either the unmagnified video data line, VD, or the magnified video data line, VDM. In this way, the image to be displayed by the display device 3 of FIG. 1 will be either the unmagnified image or a magnified portion of that unmagnified image. The selection of the line, VD, or the magnified line, VDM, is under control of the magnification switch 13.

As indicated in FIG. 5, the switch 13 is any conventional switch which can be set to select one and only one of the positions that designate 1-, 4-, 8-, 16- or 32-times magnification. If 1-times magnification is selected, then the multiplexer 40 will select the VD signal for connection to the $\overline{VDO}$ line. If 1-times magnification is not selected, then multiplexer 40 will select the VDM signal.

In FIG. 5, when a multiplication is to occur, the digital data on the VD line is input to the serial input of the input shift register 37. The data on the VD line is clocked into the register 37 by the signal on the bit clock line, BC, which comes from the bit clock generator 30.

In FIG. 5, generator 30 includes a clock frequency multiplier 22 which produces the bit clock signal, BC, at a multiple, such as 1000, times the horizontal sync, HS, frequency. For example, the multiplier 22 typically includes a conventional variable-frequency oscillator circuit which has a frequency of 1000-times HS and is connected in a conventional frequency synchronizing circuit which continually adjusts the frequency to ensure that each 1000th pulse is synchronized with the HS signal.

Generator 30 also includes a conventional bit counter 23 which repeatedly counts BC clock bits and after each eight bits, resets. The output from the bit counter in the bit clock generator, after four BC clocks, is the BC4 signal and after eight BC clocks, is the BC8 signal. The clock signals BC, BC4 and BC8 from generator 30 are distributed to the registers 37, 38 and 39 to control clocking of image data. The BC signal clocks each bit of the video data, VD, serially into register 37. The BC8 signal output from generator 30 clocks a buffer register 38 to store in parallel the 8-bit output from the input shift register 37. In this manner, the serial input video data bits from isolator gate 28 are grouped into 8-bit bytes of data. The 8-bit bytes representing the unmagnified image are transferred from register 38 over input bus I(7-0) and stored through buffers 53 and 56 in one of the random access memories 48 and 49 for processing by processor 32.

After processing, the data representing the magnified image is transferred a byte at a time from memories 48 and 49 through selectors 54 and 57 over output bus O(7-0) to output register 39. Register 39 receives data a byte at a time from output bus, O(7-0), under control of the CO8 signal. Data is clocked out from register 39, a bit at a time, by the BC4 clock signal from generator 30.

In FIG. 5, a microprocessor controller 32, in one preferred embodiment a Zilog Model Z80, is present to carry out the processing functions required in the adapter unit. The processor 32 has a bi-directional, 8-bit data bus 36, D(7-0), a 16-bit address bus 35, A(15-0), and a number of control lines 34. Also, the processor 32 receives the 4 MHz clock line from an oscillator 33.

The processor 32 functions in one of four operating modes. Mode 1 is "Search For Cursor". Mode 2 is "Input Data From Area of Cursor". Mode 3 is "Display at Pointer", and Mode 4 is "Scan Across". The processor 33 interrogates the special controls 12 to detect their settings and uses that information to operate in one of the various modes of the system. The modes of operation will be described hereinafter in further detail.

A control unit 31 operates to generate the control signals required by the units of FIG. 5. Details of the control unit 31 are described hereinafter in connection with FIG. 6.

In each mode of operation, the video data, after being loaded into the input buffer register 38, is connected over the input bus I(7-0) to the input selectors 53 and 56. Selector 53, under control of a $\overline{AIW}$ signal from the control 31 gates data into random access memory 48 (RAM A). Selector 56, under control of a $\overline{BIW}$ signal from control 31, gates input data into the random access memory 49 (RAM B). The locations at which input data is stored in the A RAM 48 or in the B RAM 49 are specified by the address counters 50 and 51, respectively.

In FIG. 5, the data bus D(7-0) connects to the processor 32, to the control 31, to random access memory 47, to read only memory 46, and through bidirectional selectors 52 and 55 to the A and B memories 48 and 49, respectively. The selectors 52 and 55 are bidirectional to transfer from the data bus to the A memory and the B memory when the $\overline{WR}$ signal from the control 31 is asserted or to transfer data from the memory 48 or 49 to the bus when $\overline{WR}$ is not asserted. The selector 52 is enabled to make a transfer only when the $\overline{AZE}$ signal is asserted and the selector 55 is enabled to make a transfer only when the $\overline{BZE}$ signal is asserted.

Data which is stored in the A memory 48 or the B memory 49 is transferred out to the output bus O(7-0) through the selector 54 or the selector 57, respectively. Selector 54 is enabled when the $\overline{AO}$ signal is asserted and selector 57 is enabled when the $\overline{DO}$ signal is asserted. Selectors 54 and 57 connect to the output bus O(7-0) which in turn connects as an input to the output register 39.

The output register 39 stores data each time the byte carryout signal, CO8 from control 31 occurs. When the CO8 signal is not asserted, then the output shift register serially shifts the data out under control of the BC4 signal from generator 30 onto the VDM line. The clock rate of the BC4 signal for ouput register 39 is one-quarter the clock rate of the BC signal for the input register 37. In this manner, the horizontal magnification of the image output from register 39 is 4-times the unmagnified image input to register 37.

The general operation of the FIG. 5 circuitry is to take the unmagnified input data from the buffer register 38 and store it into one of the memories 48 or 49. One of the memories receives input data while at the same time, the other one of the memories is available for supplying output data to the output shift register 39.

The addresses at which data is stored into the memories 48 and 49 and is read out from memories 48 and 49 is under control of the 11-bit address counters 50 and 51.

The address counter 50 (MEM ADDR CTR A) is parallel loaded with an initial address count from an address A(10-0) on the address bus 35 under control of the signal $\overline{AZE}$ from the control 31. Similarly, the address counter 51 (MEM ADDR CTR B) is parallel loaded with an initial address under control of the $\overline{BZE}$ signal from control 31. Counters 50 and 51 are loaded during the invisible horizontal retrace time.

Counter 50, when not parallel loaded and during the visible horizontal scanning, is incremented one address count at a time by the clock memory signal CMA from control 31, and similarly counter 51 is clocked under control of the clock memory B signal, CMB. Memory 48 is enabled to write data whenever the AIW or the WZA signal is asserted by control 31. The B memory 49 is enabled to write data whenever the BIW or the WZB signal is asserted by the control 31.

In FIG. 5, the read-only memory 46 is addressed by address bus 35 to provide data on the data bus D(7-0) when the $\overline{EO}$ signal from control 31 is asserted. The random access memory 47 scratchpad memory which can be used by the processor 32 in carrying out any of the functions required. Memory 47 is accessed when enabled by the $\overline{E4}$ signal. The memory access is for writing when the $\overline{WR}$ signal is asserted and is for reading when $\overline{WR}$ is not asserted.

In FIG. 5, the magnification switch 13 is connected through the selector 41 to the data bus D(7-0). Selector 41 is enabled to transfer the state of the switch 13 to the data bus when the $\overline{IS1}$ signal from control 31 is asserted. The 1-times magnification tap of switch 13 is the MG1 control for multiplexer 40.

The cursor position switch 14 and the function switch 18 connect through the selector 42 to the data bus 36. The states of the cursor position and function switches are connected to the data bus when the $\overline{IS2}$ signal from control 31 is asserted.

In FIG. 5, the pointer 17 typically includes two variable position resistors, one of each of two orthogonal axes. The resistance in each of the two resistors is changed as a function of the position of the pointer relative to the orthogonal axes. The outputs from the resistors in the pointer 17 connect to analog digital converters 44 and 45. The state of the resistance for one axis is digitized in the adapter 44 and of the other axis in the adapter 45 whenever the control signals $\overline{IJV}$ and $\overline{IJH}$ are asserted, respectively. The state of each of the horizontal and vertical pointer positions are gated to the data bus through the selector 42 whenever the control signal $\overline{IS1}$ is asserted from control 31.

In operation, the processor 32 senses the states of the magnification switch 13, the cursor position switch 14, the function switch 18 and the pointer 17. The positions of these switches are used to determine the type of modification to be made to the unmagnified image data stored in one of the random access memories 48 or 49. Only that portion of the unmagnified image data which is to be magnified is stored into the memories 48 and 49. The stored image data is transformed to provide for the desired magnification or other modification. The image data output from the memories had been modified, as a function of the special switch settings, in order to load the output shift register 39 with the modified data for the displayed image.

Control Unit—FIG. 6

In FIG. 6, further details of the control unit 31 within the adapter of FIG. 5 are shown. The control unit of FIG. 6 operates under control of data in the 8-bit register 68 which is loaded from the data bus D(7-0) under control of the processor 32 of FIG. 5. The control signals on lines 34 between processor 32 and control unit 31 of FIG. 5 are designated by brackets "[ ]" in FIG. 6. The data register 68 is loaded with six bits (two bits are unused) of data when decoder 71 asserts the LD CTLR signal. That signal is asserted when the address bits A6 and A7 and the $\overline{IORQ}$ signal are sensed as 0's by the gate 58. Whenever they are logical 0's, gate 58 is satisfied to assert a 1 which is inverted in inverter 59 to provide a logical 0 to enable decoders 70 and 71. Decoders 70 and 71 are also enabled when the read signal $[\overline{RD}]$ is asserted.

The wait-state flip-flop 69 is set by a LD WAIT signal from decoder 71 and is cleared each time a horizontal scan retrace period occurs, that is $\overline{HS}$ is a logical "0".

In FIG. 6, the B0 signal from register 68 signifies when modified data to be read out from the B memory 49. The BI signal signifies when unmodified data is to be written into the B memory 49 from the input buffer register 38 of FIG. 5. The BZ signal is asserted to indicate when the B memory 49 is to be connected to the data bus, D(7-0) for reading or writing of image data by the processor 32 of FIG. 5 for modification.

The AO signal specifies when modified image data is to be read out from the A memory 48 to the output shift register 39. The AI signal signifies when unmodified data is to be written into the A memory 48 from the input buffer register 38. The AZ signal signifies when the A memory 48 is to connected to the data bus 36 for reading or writing by the processor for modification.

In FIG. 6, the decoder 70 decodes the input address bits A0 and A1 when enabled by the $[\overline{RD}]$ signal and when not inhibited by the $[\overline{IORQ}]$ signal to assert one of the output signals $\overline{IS1}$, $\overline{IS2}$, $\overline{IJV}$ and $\overline{IJH}$. These signals as outputs from the decoder 70 control the gating of signals for connecting the states of the special switches 13, 14, 18 and the pointer 17 to the data bus. The states of the special switches are read when they are addressed with a decode of address bits A0 and A1 from the microprocessor 32 of FIG. 5.

In FIG. 6, 8-bit shift register 67 functions as a byte counter. Register 67 is loaded with 0000010 when the $\overline{HS}$ signal is not asserted and is enabled to shift left to right when the $\overline{HS}$ signal is asserted. Register 67 shifts in response to the BC4 clock pulses. The carryout from the eighth stage of register 67 is sensed in synchronization with an BC4 pulse by the gate 83 to provide the CO8G signal which is the clocking input to gates 92 and 95 and which occurs once for each eight BC4 clock pulses. The Q output from the eighth stage of register 67 is the serial input to the first stage.

The gates 92, 93 and 94 sense the conditions under which the A memory address counter 50 is clocked automatically either under control of the CO8G output from the gate 93 or the BC8 signal when gate 61 is enabled by a logical 0 for the HS signal.

The gates 94 and 96 receive the clocking input from the gate 61 which is enabled to provide the clocking signal from the BC8 signal from the bit clock generator 30 of FIG. 5 whenever the HS signal is not asserted.

In FIG. 6, gate 92 is satisfied to pass the clocking signal whenever the AO signal is asserted to indicate that the A memory 48 is to provide output data.

The gate 94 is active to pass the BC8G clock signal whenever the AI signal from register 68 is asserted to cause input data to be stored in the A memory. If either gate 92 or 94 is enabled, then clocking signals are passed through gate 93 to form the CMA signal for clocking the A memory address counter. When data is stored into the A memory, it is stored at the BC8G clock rate and when read from the A memory it is read at the CO8G rate.

In a similar manner, when the BO signal from register 68 is asserted to indicate that the B memory 49 is to output data, then gate 95 is satisfied to pass the CO8G signal from gate 83 which then passes through gate 97 to form the CMB signal. If the BI signal from register 68 is asserted to indicate that the B memory is to input data, then the gate 96 is satisfied to pass the BC8G signal through gate 97 to form the CMB signal. The CMB signal clocks the B memory address counter 51.

When data is stored into the B memory, it is stored at the BC8G clock rate and when read from the B memory it is read at the CO8G rate.

In FIG. 6, the address bits A11, A12, A13, A14, and A15 are decoded to assert the $\overline{E0}$ and $\overline{E4}$ signals for enabling the ROM 46 and RAM 47 in FIG. 5. The $\overline{E0}$ and $\overline{E4}$ signals can be asserted, when addressed by the appropriate address bits, provided the [$\overline{MREQ}$] signal is not asserted, that is, provided that a memory request is active for the processor 32 of FIG. 5.

The control circuitry of FIG. 6 operates in response to the processor 32 of FIG. 5 to control the adapter unit 8 of FIG. 1 in several different modes of operation.

Modes of Operation

The adapter unit 8 of FIG. 1, as shown in detail in FIG 5, has four internal operating modes. During all of the modes of operation, for each visible scanline across the display screen 19 of FIG. 1, one of the A or B RAM memories 48 or 49 is read, 8 bits at a time, to provide data through the output shift register 39, through the multiplexer 40 onto the $\overline{VDO}$ line to the display device 3. During this time, the processor 32 calculates the starting memory address for the next scanline and loads that address into the memory address counter at the beginning of the next scanline. During any one scanline, the A or B memory address counter 50 or 51 is automatically incremented to each new byte address by operation of the control unit 31 circuitry of FIG. 6 as previously described.

Mode 1, Search for Cursor

When the mode switch in the function switches 18 has DC selected the first procedure is to search for the cursor. Several times a second, the display device 19 must be updated with current image data. Updating occurs by first detecting the stable location of the cursor and then reading data from those scanlines in the area of the cursor. If a stable cursor is not found, that is, if a cursor is either moving or is not found on the generated image, the outputting of data is stopped until a stable cursor is found.

If the cursor is a blinking underline or a reversed video block, the cursor is found on only one scanline in each row of characters. Only those scanlines (typically every tenth line of a page image) need be read and examined to locate the cursor. The microprocessor initiates reading the appropriate scanlines by setting a starting address into the input memory address counter (for example, the A counter 50) to designate the beginning of the appropriate scanline. Thereafter, serial input data is shifted into the input shift register 37 and is written into the corresponding RAM memory, for the example described, the A RAM memory 48. The data is written into the memory byte by byte without direct processor 32 control until the end of the scanline. During the next scanline (typically nine scanlines ahead) but before the next scanline which possibly contains the cursor, processor 32 examines the received data for a possible cursor. This search process is repeated for all those scanlines which could contain a cursor. This search process is repeated for successive frames until the processor 32 detects a cursor. After mode 1 is completed, the processor 32 then commences mode 2.

Mode 2, Display Data from the Cursor Area

After finding the cursor location and based upon the desired magnification, the processor 32 determines which scanlines are to be read and which data in those scanlines is to be displayed. The top-most desired scanline is read. During subsequent scanlines, the microprocessor moves the desired data from the input buffer area of the input memory (the A memory in the present example) to the display area of the input memory causing each bit to be mapped to a larger number of bits in accordance with the desired magnification. For greater magnifications, less data per line and fewer scanlines must be processed. This process is repeated for subsequent scanlines in each frame. Those scanlines which were missed are read and processed during subsequent frames. Several frames may be required to input all the desired scanlines. After all the display data resides in the display area of the input memory, the function of the memory is changed to output data and the function of the other memory is changed to input data.

When the mode 2 is terminated, the front panel switches are sensed by the processor to determine if another function has been requested. If not, then mode 1 is repeated and a search for the cursor starts again.

Processor Programs

The processor 32 of FIG. 5 executes a number of routines during the operation of the present invention. A SUPERVISOR ROUTINE is continuously executed to read the switches 13, 14 and 18 in FIG. 5, to set constants and to provide entry to the other routines. The SUPERVISOR ROUTINE, as a function of switch settings provides entry to the display routines which are a POINTER ROUTINE for pointer control, a CURSOR ROUTINE for cursor control and a SCAN ROUTINE for continuous scanning operation. The display routines in turn provide entry to an INPUT-REFORMAT ROUTINE for reformatting input data which in turn provides entry to an OUTPUT ROUTINE for connecting the modified image data to the display device. Examples of these routines are given in the following tables for an adapter unit capable of 4, 8 or 16 times magnification of an input image.

TABLE I
SUPERVISOR ROUTINE

READ CURSOR POSITION SWITCHES
SET CVC, [CVC: CURSOR VERTICAL CONSTANT]
SET CHC, [CHC: CURSOR HORIZONTAL CONSTANT]
READ MAGNIFICATION SWITCH
SET MAG TO 4, 8, 16 [MAG: MAGNIFICATION CONSTANT]
READ FS, [FS: FUNCTION SWITCH]
IF FS=DISPLAY AT POINTER
GO TO POINTER ROUTINE
IF FS=DISPLAY AT CURSOR
GO TO CURSOR ROUTINE
ELSE FS=SCAN ACROSS
GO TO SCAN ROUTINE
RETURN

TABLE II
POINTER ROUTINE

SET JVC=0, [JVC: POINTER VERTICAL COUNT]
SET JHC=0, [JHC: POINTER HORIZONTAL COUNT]
ISSUE ISV, STARTS JVPT=1, [JVPT: POINTER VERTICAL POSITION TIMER]
FIND HORIZONTAL SYNC
INCREMENT JVC,
REPEAT UNTIL JVPT=0
CONVERT JVC TO VO, VO=JVC/N [VO: VERTICAL OFFSET]
ISSUE ISH, STARTS JHPT=1 [JHPT: POINTER HORIZONTAL POSITION TIMER]
FIND HORIZONTAL SYNC
INCREMENT JHC
REPEAT UNTIL JHPT=0
CONVERT JHC TO HO, JHC=HO [HO: HORIZONTAL OFFSET]
GO TO INPUT-REFORMAT ROUTINE

TABLE III
CURSOR ROUTINE

SET ULC, [ULC: UNUSED LINE COUNT]
SET CIA, TO BEGINNING ADDRESS OF BUFFER IN MEMORY [CIA: CURRENT INPUT ADDRESS]
SET CLN, TO CURSOR LINE NUMBER FOR FIRST ROW [CLN: CURSOR LINE NUMBER]
SET LL, [LL: BYTES IN A SCAN LINE]
SET TL, [TL: TOTAL LINES PER DISPLAY]
SET LR, [LR: LINES PER ROW OF DISPLAYED CHARACTERS]
FIND VERTICAL SYNC
FIND HORIZONTAL SYNC
DECREMENT ULC
REPEAT UNTIL ULC=0
EXAMINE A SCAN LINE FOR THE PRESENCE OF A CURSOR
FIND HORIZONTAL SYNC
DECREMENT CLN
INCREMENT LC, [LC: LINE COUNT]
REPEAT UNTIL CLN=0
SET CIA INTO MEMORY ADDRESS COUNTER
SET INPUT MODE (DURING NEXT SCAN LINE, LL CONSECUTIVE DISPLAY BYTES ARE DIRECTLY WRITTEN INTO MEMORY)
FIND HORIZONTAL SYNC

TABLE III-continued
CURSOR ROUTINE

RESET INPUT MODE
EXAMINE LL BYTES IN MEMORY LOCATIONS CIA TO CIA+LL FOR CURSOR SYMBOL
IF CURSOR IS DETECTED,
VO=LC [VO: VERTICAL OFFSET]
HO=DETECTED CURSOR POSITION ALONG ROW [HO: HORIZONTAL OFFSET]
GO TO INPUT-REFORMAT ROUTINE
ELSE
SET CLN=LR
REPEAT UNTIL LC IS GREATER THAN TL, TOTAL DISPLAYED LINES
REPEAT

TABLE IV
SCAN ROUTINE

SET CR, [CR: CHARACTER POSITIONS IN EACH ROW]
SET HO=0, HORIZONTAL OFFSET TO ZERO
DISPLAY FOR RC FRAMES [RC: REPEAT COUNT]
SET REPEAT COUNT RC=15, (DISPLAY SHIFTS TO RIGHT 4 TIMES A SECOND)
GO TO INPUT-REFORMAT ROUTINE
DECREMENT RC
REPEAT UNTIL RC=0
HO=HO+16/MAG, (DISPLAY SHIFTS 1, 2, OR 4 CHARACTERS TO THE RIGHT FOR MAGNIFICATION OF 16, 8 OR 4)
REPEAT UNTIL HO IS GREATER THAN CR
RETURN TO SUPERVISOR ROUTINE

TABLE V
INPUT-REFORMAT ROUTINE

IF INTERRUPT,
GO TO OUTPUT ROUTINE
ELSE
SET ULC, [ULC: UNUSED LINE COUNT]
SET CIA, [CIA: CURRENT INPUT MEMORY ADDRESS] TO BEGINNING ADDRESS OF BUFFER IN MEMORY
SET LC=0, [LC: LINE COUNT]
SET TIL, [TIL: TOTAL LINES TO BE INPUTTED]
SET HO, [HO: HORIZONTAL OFFSET]
SET VO, [VO: VERTICAL OFFSET LINE NUMBER]
INPUT LC LINES BEGINNING FROM LINE VO INTO MEMORY STARTING AT ADDRESS, CIA
FIND VERTICAL SYNC
FIND HORIZ SYNC
DECREMENT ULC
REPEAT UNTIL ULC=0
FIND HORIZ SYNC
DECREMENT VO
REPEAT UNTIL VO=0
SET CURRENT INPUT ADDRESS, CIA, INTO MEMORY ADDRESS REGISTER, MAR
SET INPUT MODE
(DURING NEXT SCAN LINES, CONSECUTIVE DISPLAY BYTES ARE WRITTEN INTO MEMORY DIRECTLY)
FIND HORIZ SYNC
DECREMENT LC
REPEAT UNTIL LC=0
RESET INPUT MODE
CIA=CIA+(LC × LL) [CALCULATE NEW CURRENT INPUT ADDRESS]
VO=VO+LC [CALCULATE NEW INPUT LINE NUMBER]
CRA=CIA+HO [CALCULATE CURRENT REFORMAT ADDRESS]
SET LC
REFORMAT LC LINES, READ DATA FROM CRA, EXPAND IF REQUIRED FOR MAGNIFICATIONS OF 8 OR 16, AND WRITE INTO COA, [COA: CURRENT OUTPUT ADDRESS]
SET COA TO BEGINNING OF OUTPUT BUFFER
SET EOB, [EOB: LAST LOCATION OF OUTPUT BUFFER]
RBC=LL/MAG [RBC: REFORMAT BYTE COUNT]
IF MAG=8, GO TO "REFORMAT 8"
IF MAG=16, GO TO "REFORMAT 16"
ELSE MAG=4 AND CONTINUE

TABLE V-continued
INPUT-REFORMAT ROUTINE

"REFORMAT 4"
READ CRA [CRA: CURRENT REFORMAT ADDRESS]
WRITE CRA INTO COA
INCREMENT CRA
INCREMENT COA
DECREMENT RBC
REPEAT UNTIL RBC=0
"REFORMAT 16"
READ CRA
INCREMENT CRA
DECREMENT RBC
QUADRUPLE BITS, EXPAND TO FOUR BYTES,
RB1, RB2, RB3, AND RB4
WRITE RB1 INTO COA
INCREMENT COA
WRITE RB2 INTO COA
INCREMENT COA
WRITE RB3 INTO COA
INCREMENT COA
WRITE RB4 INTO COA
INCREMENT COA
REPEAT UNTIL RBC=0
"REFORMAT 8"
READ DATA FROM CRA
INCREMENT CRA
DECREMENT RBC
DOUBLE BITS, EXPAND TO TWO BYTES, RB1 AND RB2
WRITE RB1 INTO COA
INCREMENT COA
WRITE RB2 INTO COA
INCREMENT COA
REPEAT UNTIL RBC=0
ADD CRA=CRA+LL−RBC
DECREMENT LC
REPEAT REFORMAT UNTIL LC=0
REPEAT IF COA IS LESS THAN EOB
GO TO OUTPUT ROUTINE

TABLE VI
OUTPUT ROUTINE

SET ULC, [ULC: UNUSED LINE COUNT]
SET COA TO BEGINNING ADDRESS OF OUTPUT SECTION OF MEMORY
SET RLC TO MAG [RLC: REPEATED LINE COUNT]
SET LL [LL: LINE LENGTH]
SET EOB [EOB: END OF BUFFER]
FIND VERTICAL SYNC
FIND HORIZ SYNC
DECREMENT ULC
REPEAT UNTIL ULC=0
OUTPUT DATA DURING NEXT SCAN LINE
FIND HORIZ SYNC
SET COA INTO MAR [CURRENT OUTPUT ADDRESS INTO MEMORY ADDRESS REGISTER]
SET OUTPUT MODE
(DURING SCAN LINE, LL BYTES ARE READ FROM CONSECUTIVE MEMORY ADDRESSES AND SERIALLY OUTPUTTED TO THE DISPLAY)
DECREMENT RLC, [RLC: REPEATED LINE COUNT]
REPEAT UNTIL RLC=0
ADD COA=COA+LL
RESET RLC TO MAG [4, 8, OR 16]
REPEAT UNTIL COA IS GREATER THAN EOB
RETURN TO SUPERVISOR ROUTINE

In the previous example of FIG. 4, an eight times magnification was described. The eight times magnification occurs as follows. As previously described, magnification by a factor of four is achieved automatically in the horizontal direction by operation of the FIG. 5 adapter. That magnification by four occurs because the input data into the input shift register 37 is received at the BC clock rate and that rate is four times faster than the BC4 clock rate at which data is shifted out of the output shift register 39. Since the display unit expects data at the BC rate, the display interprets the data as four times as much data, hence, the four times magnification.

In the routines given in the above tables, further magnification occurs in the following manner. The SUPERVISOR ROUTINE detects that a CURSOR ROUTINE has been specified by the function switches and causes entry to the CURSOR ROUTINE. The CURSOR ROUTINE locates the position of the cursor and designates its horizontal position by the HO offset and its vertical position by the VO offset. When located, the CURSOR ROUTINE provides entry to the INPUT-REFORMAT ROUTINE.

In the INPUT-REFORMAT ROUTINE, various addresses are determined and then the program executes the "REFORMAT 8" subroutine. Up to this point, the input data has been stored with the information to be displayed (in this case, beginning with the letter M in the word MEN) at, CRA, the CURRENT REFORMAT ADDRESS. The data is read from this address and then CRA is incremented by one and the remaining byte count, RBC, is decremented. The data read from CRA is then expanded from one byte to two bytes, namely RB1 and RB2. Each bit in the original byte is expanded to two identical bits. For example, the byte 01101100 becomes the RB1 byte 00111100 and the RB2 byte 11110000. The RB1 byte is written into the COA (current output address). Then the COA is incremented and second byte, RB2, is written into the COA address incremented by one. In this way, a single byte of data has been expanded to two bytes of data, thereby giving a multiplication factor of two to the output image. This multiplication factor of two, together with the automatic multiplication by four implemented by the FIG. 5 adapter, makes a total magnification of eight in the horizontal direction. After completing the horizontal expansion, the entry is made to the OUTPUT ROUTINE.

In the OUTPUT ROUTINE, vertical direction magnification is achieved. Rather than outputting the data for each scanline once, the OUTPUT ROUTINE repetitively outputs the data a number of times equal to the magnification. In TABLE VI, this repetition is achieved by setting RLC (the REPEATED LINE COUNT) equal to MAG (the magnification). Each time the line of data is outputted, RLC is decremented and this decrementing is repeated until RLC=0. At this time, the same line of data has been outputted MAG times. Then, a new line of data is outputted by changing the current output address, COA, to the address of the next line which is calculated by adding COA+LL. This whole process is repeated until the current address, COA, is greater than the end of the buffer, EOB. The OUTPUT ROUTINE then returns to the SUPERVISOR ROUTINE.

Further and Other Embodiments

While the present invention specifically contemplates that the modifications of the generated image signals are magnification, other modifications may be carried out by the adapter unit within the spirit of the present invention.

While a display device for visual sensing has been described in detail, other display devices may be employed. For blind people, even a highly magnified output image is not useful. For blind people, the display device is preferably one which forms a display for sensory perception other than sight such as feeling or hearing. In one example, the display device can be a tactile display. Vibrating pin tactile devices are well known for providing a tactile image for the blind. Such tactile devices, however, have been very expensive to build and control. By use of the adapter unit of the present invention, a conventional digital image generator can be converted, through the adapter unit, to provide a tactile image output readily usable by the blind.

In a similar manner, the adapter unit of the present invention may be employed to adapt the conventional digital image generator output as an input to a speech synthesizer. Such a device is also usable by the blind. Such a device detects the bit patterns representing individual alphanumeric characters. These characters are then recognized in word groups and inputted into a word-to-speech synthesizer.

While the invention has been particularly shown and described with reference to the preferred embodiments thereof, it will be understood by those skilled in the art that changes in form and details may be made therein without departing from the spirit and the scope of the invention.

What is claimed is:

1. An adapter to enable a visually impaired viewer to view a raster scan displayed image in an output device where the display apparatus includes a generator for forming generated image signals in the form of generated video display signals representing an unmodified image and includes a display device for forming the displayed image in response to the generated video display signals, said display device operative upon receipt of said generated video display signals to display said unmodified image, said generated video display signals including a generated video data signal having bit scanlines defined by an output horizontal sync signal and an output vertical sync signal, each of said bit scanlines having a fixed duration measured by said horizontal sync signal, each of said bit scanlines defining the generated video data signal for one horizontal scanline where each bit in each scanline of the generated video data signal is represented in an unclocked form, said displayed image having a size determined by said video data signal, said adapter comprising, bit clock generator means connected to receive said horizontal sync signal for generating a bit clock signal synchronized by the horizontal sync signal, input register means, connected to receive the generated video data signal and the bit clock signal, for storing bits for each scanline of the generated video data signal in clocked form thereby providing intercepted video data signals representing the generated image, means connected in response to a signal from a viewer to prevent said unmodified image from being displayed, storage means, connected to said input register means, for storing said intercepted image, said storage means including random access memory means, control means including means for controlling the accessing of signals from and to said memory means, including means controlling the storage of said intercepted video data signals into said memory means, and including means controlling the modification of a portion of said intercepted video data signals to form stored signals in said memory means, means for transforming at least a portion of the stored signals to form display signals representing a modified image, means for transferring said display signals to said display device whereby said displayed image corresponds to said modified image.

2. The adapter of claim 1 wherein said memory means includes a first memory and a second memory, and wherein said control means includes first input means for storing said generated image signals into said first memory during a first cycle and includes first output means for accessing said output signals from said second memory during a second cycle, and includes second input means for storing said generated image signals into said second memory during said second cycle and includes second output means for accessing said output signals from said first memory during said first cycle, and includes means for alternating said first and second cycles.

3. The adapter of claim 1 wherein said control means includes means for scanning said generated signals in said memory means to find a cursor signal.

4. The adapter of claim 2 wherein said control means further includes first clock means for controlling data transfer by said first and said second input means at one clock rate and includes second clock means for controlling data transfer by said first and second output means at said second clock rate.

5. The adapter of claim 1 wherein said means controlling the modification includes processor means whereby modification of said generated signal is under processor control.

6. The adapter of claim 5 wherein said processor means includes means for expanding each bit in each selected byte of unmodified data to two or more bits whereby two or more bytes of modified data are formed for each said selected byte of unmodified data whereby said modified data represents an image expanded in one axis two or more times.

7. The adapter of claim 1 wherein said control means includes means for identifying each scan line of said display signals, means for repeatedly accessing each scan line of said display signals a number of times equal to the magnification factor whereby the displayed image becomes magnified by the magnification factor.

8. The adapter of claim 4 wherein said second clock rate is one-quarter said first clock rate whereby the displayed image is magnified four-times the generated image.

9. The adapter of claim 4 wherein said adapter includes clock generator means responsive to said generator image signals for generating said first clock rate.

10. The adapter of claim 9 wherein said generator generates said image signals with a horizontal sync signal and wherein said clock generator includes means for generating said first clock signal with a frequency which is a multiple of said horizontal sync signal.

11. The apparatus of claim 1 wherein said output device is a display device for human viewing.

12. The apparatus of claim 1 wherein said output device is a tactile device for human feeling of the output image.

13. The apparatus of claim 1 wherein said output device includes a speech synthesizer for human hearing of the output image.

14. An adapter to enable a visually impaired viewer to view a raster scan displayed image in a display apparatus where the display apparatus includes a generator for forming generated image signals in the form of generated video display signals representing an unmodified image and includes a display device for forming the displayed image in response to the generated video display signals, said display device operative upon receipt of said generated video display signals to display said unmodified image, said generated video display signals including a generated video data signal having bit scanlines defined by an output horizontal sync signal and an output vertical sync signal, each of said bit scanlines having a fixed duration measured by said horizontal sync signal, each of said bit scanlines defining the generated video data signal for one horizontal scanline where each bit in each scanline of the generated video data signal is represented in an unclocked form, said displayed image having a size determined by said video data signal, said adapter comprising, bit clock generator means connected to receive said horizontal sync signal for generating a bit clock signal synchronized by the horizontal sync signal, input register means, connected to receive the generated video data signal and the bit clock signal, for storing bits for each scanline of the generated video data signal in clocked form thereby providing intercepted video data signals representing the generated image, means connected in response to a signal from a viewer to prevent said unmodified image from being displayed, storage means, connected to said input register means, for storing said intercepted image, said storage means including random access memory means formed by a first memory and a second memory, control means including means for controlling the accessing of signals from and to said memory means, including means controlling the storage of said intercepted video data signals into said memory means, and including means controlling the modification of a portion of said intercepted video data signals to form stored signals in said memory means, said control means including first input means for storing said intercepted video data signals into said first memory during a first cycle, and including first output means for accessing signals from said second memory during a second cycle, second input means for storing said intercepted video data signals into said second memory during a second cycle and including second output means for accessing signals from said first memory during said first cycle, and including means for alternating said first and second cycles, means for transforming at least a portion of the stored signals to form display signals representing a modified image, means for transferring said display signals to said display device whereby said displayed image corresponds to said modified image.

* * * * *